United States Patent [19]

Nagata

[11] Patent Number: 4,686,525

[45] Date of Patent: Aug. 11, 1987

[54] IMAGE DATA OUTPUT APPARATUS

[75] Inventor: Satoshi Nagata, Tokyo, Japan

[73] Assignee: Canon Kabushiki Kaisha, Tokyo, Japan

[21] Appl. No.: 657,784

[22] Filed: Oct. 4, 1984

[30] Foreign Application Priority Data

Oct. 11, 1983 [JP] Japan .................. 58-188351

[51] Int. Cl.$^4$ ............................................. G09G 1/00
[52] U.S. Cl. .................... 340/790; 340/735; 382/69; 400/171
[58] Field of Search ............... 400/171, 120, 121, 126, 400/110; 340/790, 735, 750, 723; 382/69; 346/153.1; 364/518

[56] References Cited

U.S. PATENT DOCUMENTS

| 3,167,746 | 1/1965 | Reines et al. | 382/69 |
| 3,678,497 | 7/1972 | Watson et al. | 340/735 |
| 4,234,931 | 11/1980 | Kanaiwa et al. | 340/790 |
| 4,241,340 | 12/1980 | Raney, Jr. | 340/731 |
| 4,359,286 | 11/1982 | Barnes et al. | 400/171 |
| 4,429,306 | 1/1984 | Macauley et al. | 340/790 |
| 4,439,761 | 3/1984 | Fleming et al. | 340/790 |

FOREIGN PATENT DOCUMENTS 2113153A 8/1983 United Kingdom ............... 364/523

Primary Examiner—Marshall M. Curtis
Attorney, Agent, or Firm—Fitzpatrick, Cella, Harper & Scinto

[57] ABSTRACT

An image data output apparatus such as a laser beam printer or the like includes an input interface, a CPU, an output interface, a detachable ROM cartridge as a character pattern generator and the like. After the initializing operation, the input interface supplies a font select command of a font to be selected to the CPU. The CPU determines whether or not attributes designated by the font select command coincide with those of fonts of the apparatus stored in respective font registers. When no coincidence is established, the CPU selects a font having attributes near those designated by the font select command. If a font having the designated attributes does not exist in the character pattern generator, the apparatus can select and generate a font having the attributes near those of the font to be selected.

15 Claims, 8 Drawing Figures

FIG. 3

| | 17 | 18 | 19 | 20 | 21 |
|---|---|---|---|---|---|
| (A) | FONT SELECT COMMAND | TYPE FACE PARAMETER | TYPE SIZE PARAMETER | TYPE INCLIN PARAMETER | TYPE THICKNESS PARAMETER |
| (B) | FONT SELECT COMMAND | 5 | 8 | 1 | 1 |
| (C) | FONT SELECT COMMAND | = | 10 | = | = |

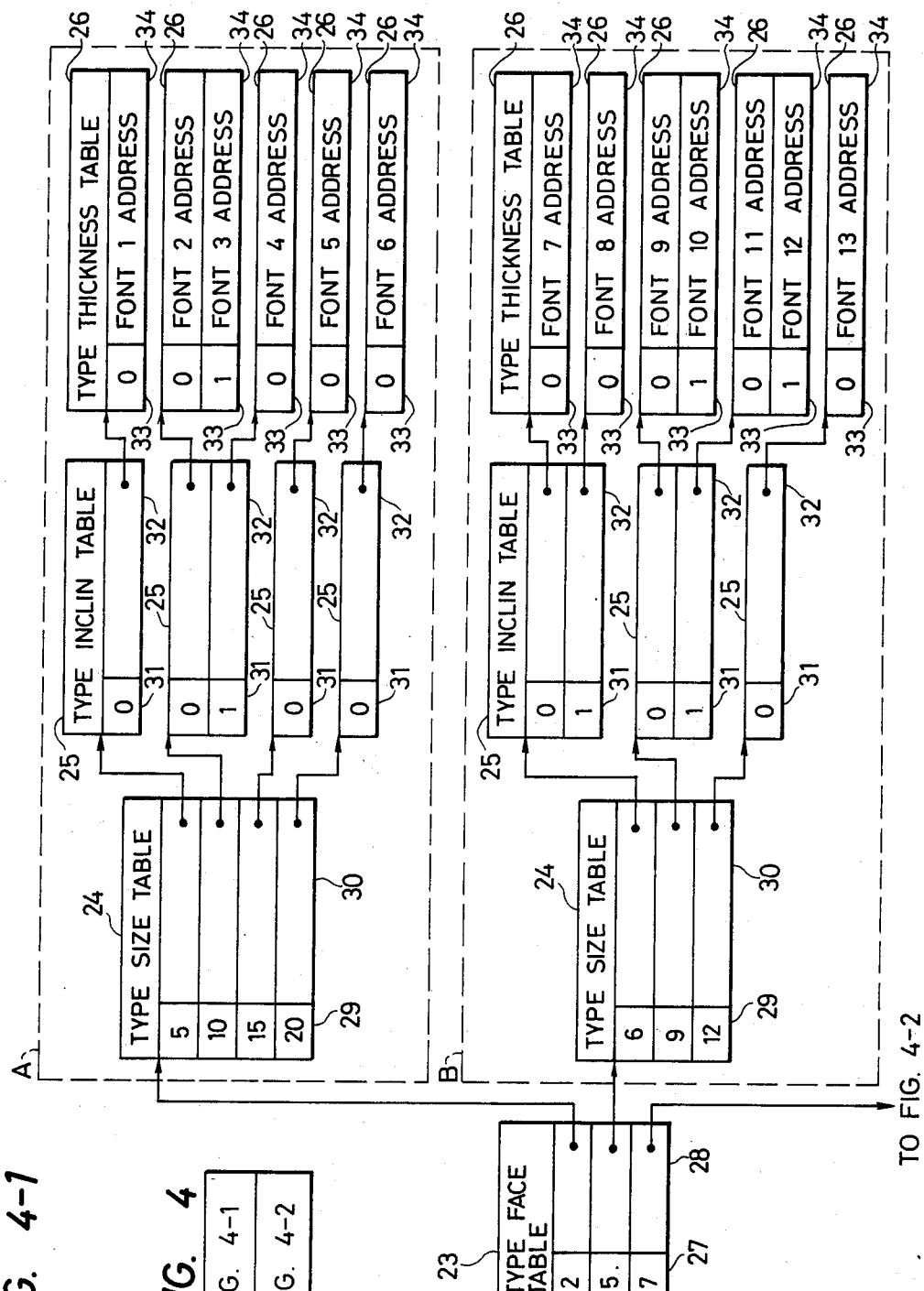

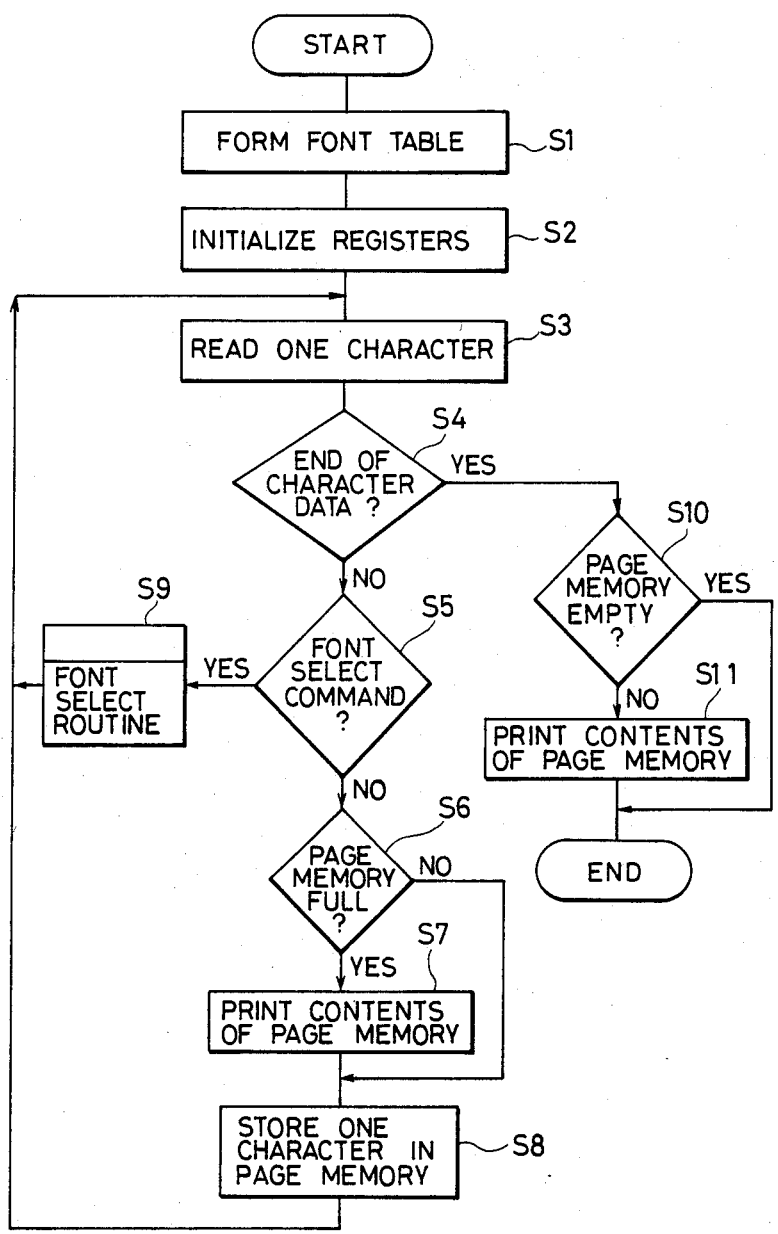

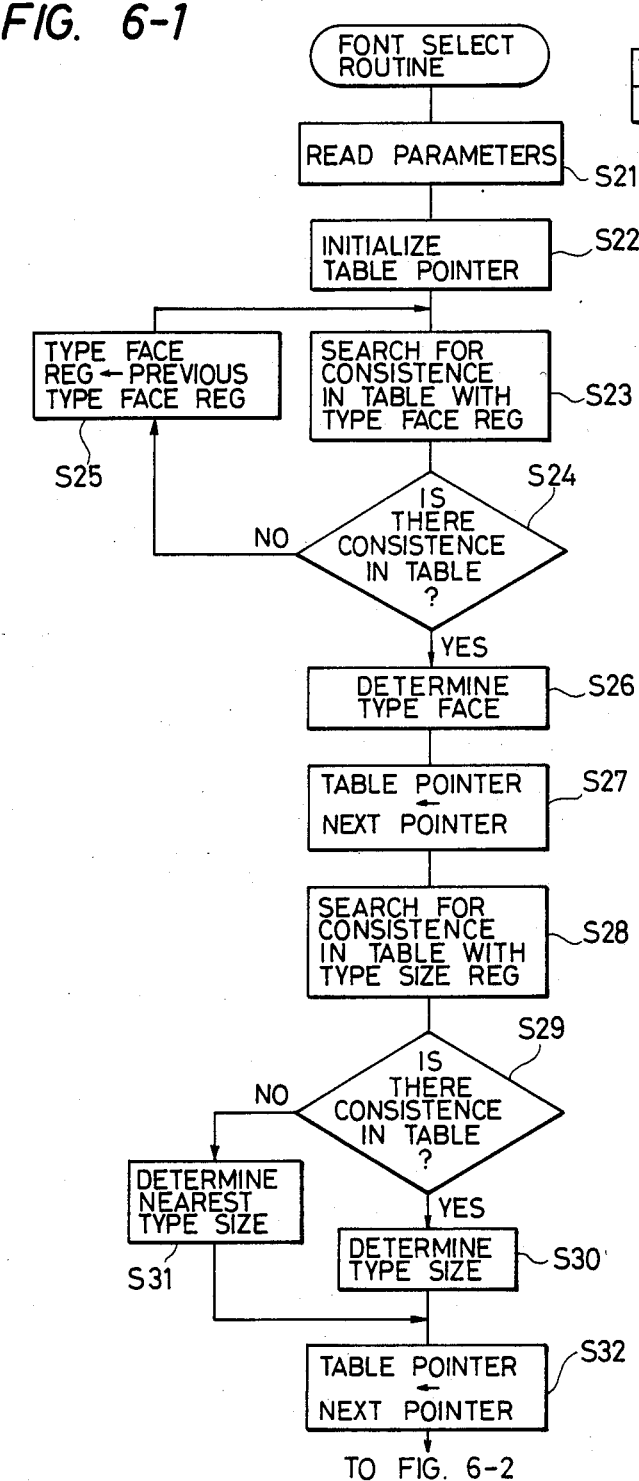

IMAGE DATA OUTPUT APPARATUS

BACKGROUND OF THE INVENTION

1. Field of the Invention

The present invention relates to an image data output apparatus such as various CRT displays or printers and, more particularly, to an image data output apparatus having a plurality of fonts.

2. Description of the Prior Art

Most conventional image data output apparatuses such as a line printer or a character display have a single font.

However, in accordance with recent spread of high-precision displays, high-resolution non-impact printers and low-cost large-capacity read-only memories (ROMs), apparatuses outputting a plurality of fonts are increasing in number. Some of these image output apparatuses have such fonts at their output sides. Particularly, in high-performance wordprocessors, printing or displaying by a plurality of fonts becomes increasingly important. In addition to this, it is expected that the number of kinds of fonts will increase.

It should be noted that "font" means a set of character patterns having the same attributes such as a character set (code or the like), a type face, a type size, a type inclination, a type thickness or the like. Note that characters here include symbols, figures and the like.

Conventionally, when a font select command is supplied to an output apparatus having such a plurality of fonts, an identification label of a font or an attribute of the font is designated. In this case, if the output apparatus has the font which coincides with the designated label or attribute, the output apparatus selects the designated font. If the designated font does not exist, the output apparatus stops its output operation or provides an error display. Thus, a state wherein the designated font does not exist has been treated as an abnormal state. In this case, a host system as a data source must be able to recognize a font mounting state of the output apparatus.

When a small and fixed number of fonts is mounted in an output device, such a conventional apparatus can meet this requirement. However, it is difficult for a host system side to recognize a font mounting state of an output apparatus having a plurality of fonts. Particularly, in an output apparatus in which the font mounting states are different for every user, a load to a host system side becomes considerable. For example, assume that an output apparatus having a font "A" and an output apparatus which does not have the font "A", but has a font "A'" having attributes near to those of the font "A" are provided. When a host system supplies data to the respective apparatuses, it must generate a font "A" select command and a font "A'" select command, respectively. In other words, since the host system completely depends upon the font mounting state of the output apparatus, it can only generate a command corresponding to it. Therefore, the host system cannot generate a command such as "A-like font".

SUMMARY OF THE INVENTION

It is an object of the present invention to prevent the above drawbacks.

It is another object of the present invention to improve an image data output apparatus.

It is still another object of the present invention to provide an image data output apparatus having a high degree of usefulness.

It is still another object of the present invention to provide an image data output apparatus wherein, even if the image data output apparatus does not have a font which has an attribute coinciding with a designated attribute, the apparatus can select a font having an attribute near to the one designated.

It is still another object of the present invention to provide an image data output apparatus which can generate a font select command even if a host system cannot completely recognize a font mounting state of the output apparatus.

It is still another object of the present invention to provide an image data output apparatus which require only designation of attributes which must be changed and does not require designation of other attributes, thereby allowing easy change and designation of a type size, and a type face such as an italic type face or bold type face.

It is still another object of the present invention to provide an image output apparatus which can perform font selection corresponding to a font mounting state thereof.

It is still another object of the present invention to provide an image output apparatus which can detect whether or not attributes of the designated font coincide with those of the font provided therein, for every factor of the attributes.

Other objects and features of the present invention will be apparent from the following detailed description and claims in accordance with the accompanying drawings.

BRIEF DESCRIPTION OF THE DRAWINGS

FIGS. 3(A) to 3(c) are respectively views showing formats of control command used in the control system of FIG. 2;

FIG. 5 is a flow chart showing the printing information data processing operation of the image data output apparatus of FIG. 2.

DETAILED DESCRIPTION OF THE PREFERRED EMBODIMENT

Figure 1:
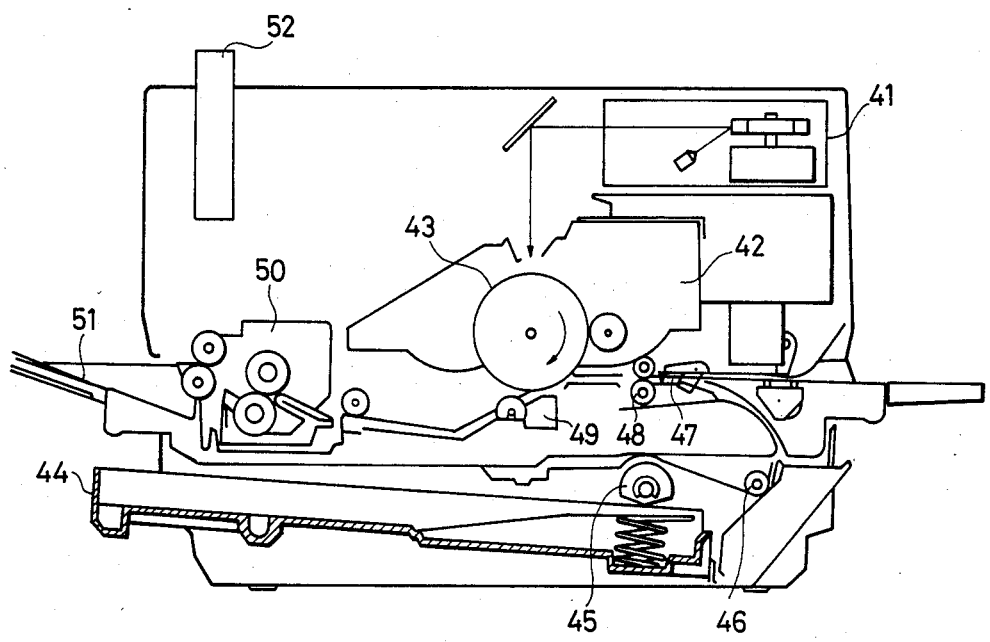
FIG. 1 is a sectional view of a laser beam printer to which the present invention can be applied.

The present invention will be described with reference to the accompanying drawings hereinafter. FIG. 1 is a sectional view showing a laser beam printer to which the present invention can be applied.

In FIG. 1, an exposure device 41 comprises a scanner and a laser unit. A developing unit 42 produces a latent image formed on a photosensitive drum 43. A pickup roller 45 picks up a paper sheet from a paper feed cassette 44 and supplies it to a convey roller 46. The paper sheet fed through the convey roller 46 is temporarily stopped by a registration shutter 47, and, at this time, the photosensitive drum 43 is controlled to rotate in synchronism with the paper feed operation. A feed roller 48 feeds the paper sheet to a transfer unit 49. A fixing unit 50 fixes a toner image transferred to the paper sheet. A stacker 51 receives discharged paper sheets. A detachable ROM cartridge 52 which can store a plurality of fonts is used as a character generator.

Figure 2:
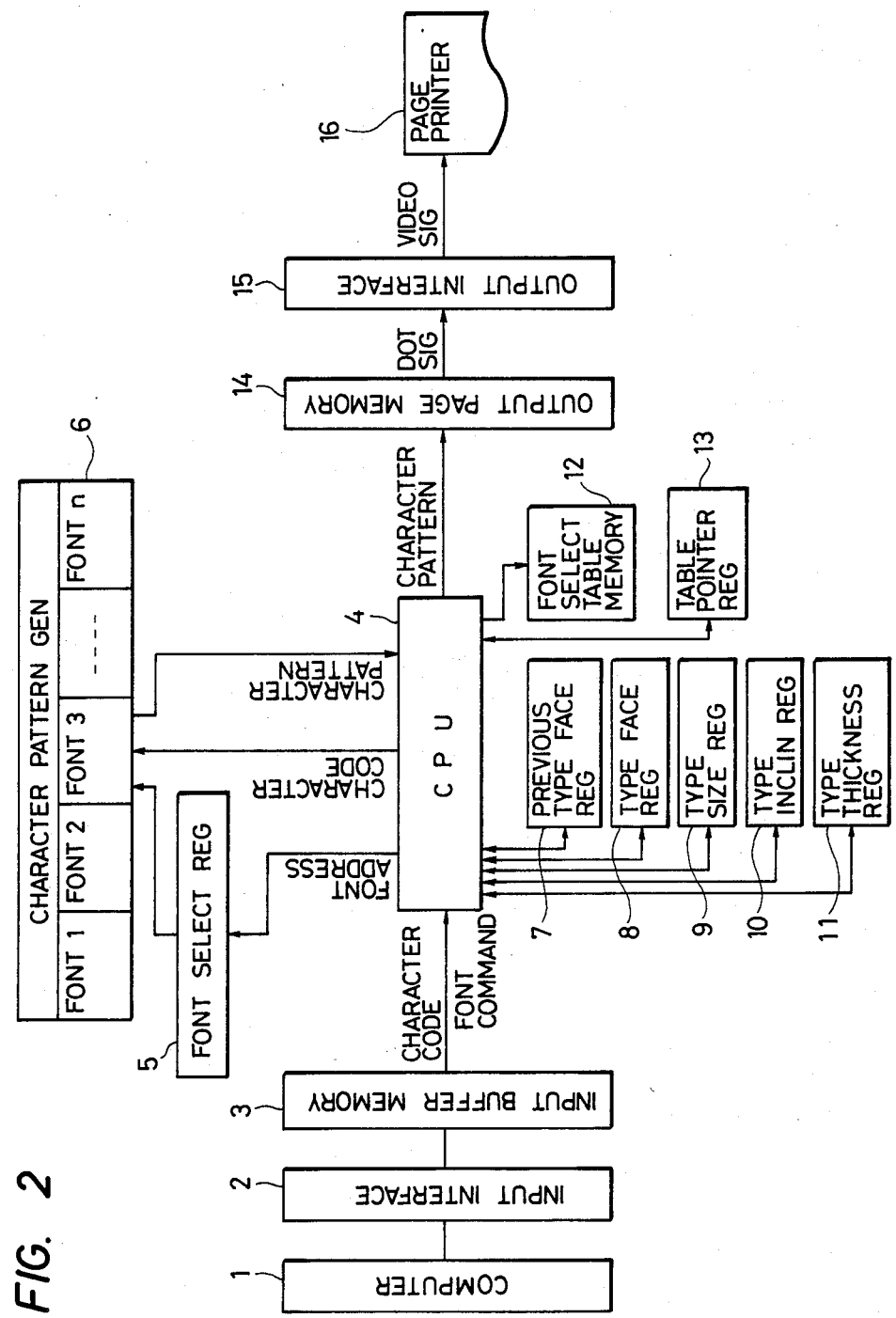
FIG. 2 is a block diagram showing a configuration of a control system of an image data output apparatus according to the present invention.

FIG. 2 shows a configuration of a control system of the image data output apparatus of the present invention. Note that the control system shown in FIG. 2 is operated in such a manner that the control system receives character code data and a control command supplied from a printing data generation source and performs the printing operation by a printing mechanism such as a laser beam printer which prints documents page by page. A printing data generator (computer) 1, consisting of a calculator and the like, generates the character code data and the control commands. An input interface 2 consisting of an input interface circuit receives the character code data and the control commands generated from the computer 1. An input buffer memory 3 temporarily stores the character code data and the control commands. The control commands include a font select command. A central processing unit (CPU) 4, comprising a microprocessor and the like, performs overall operation control. A font select register 5 designates a start address of data of a font which is selected by the CPU 4. A character pattern generator 6 which can generate for a plurality of fonts consists of a ROM and the like and has a code converting function which converts the character code data into a character pattern. The character pattern generator 6 can consist of a detachable font ROM cartridge, as shown in FIG. 1.

Furthermore, a previous type face register 7 stores a previous type face selected in advance. A type face register 8 stores type face parameters of the font select command. A type size register 9 stores type size parameters of the font select command. A type inclination register 10 stores character inclination parameters of the font select command. A type thickness register 11 stores type thickness parameters of the font select command. A font select table memory 12 consists of a random-access memory (RAM) and the like. In the font select table memory, the fonts are classified by every attribute to allow correct selection of a font when a font select command is generated. A table pointer register 13 is used for sequentially retrieving the font select table memory 12.

An output page memory 14 temporarily and sequentially stores printing data of dot type (i.e., the character pattern) for one page supplied from the CPU 4. An output interface 15 converts a dot signal generated from the output page memory 14 into a video signal and supplies it to a page printer 16. The page printer 16 actually prints a character image on a recording medium in response to the video signal.

FIGS. 3(A) to 3(C) respectively show formats of the control command used in the control system of FIG. 2. Note that the control command of this embodiment is formatted for an English type face. FIG. 3(A) shows a structure of the control command for font selection. As shown in FIG. 3(A), after a font select command 17, respective attributes are designated using four parameters 18 to 21. The four parameters 18 to 21 are classified from those of higher priority. The relationship among these parameters is fixed. The parameters 18 to 21 are respectively set to be a fixed length and a boundary mark is not provided between the respective parameters. The highest priority attribute parameter is the type face parameter 18. The type face parameter 18 corresponds to so-called type faces, and the type faces are designated by respective numbers. The numbers corresponding to the respective type faces are predetermined. For example, a pica type face is represented by "1", and a times roman type face is represented by "5".

The second priority attribute parameter is the type size parameter 19. The type size parameter 19 designates a size of characters, more specifically, a height of the characters by the number of points. The third attribute parameter is the type inclination parameter 20 and designates so-called italics. For example, "0" represents a normal type face and "1" represents an italic type face. The fourth attribute parameter is a type thickness parameter 21, and designates a thickness of a line of the characters. For example, "0" represents a regular type face and "1" represents a bold type face.

FIG. 3(B) shows an example of the font select command according to the above format. By this font select command, "the 8-point italic bold type face of the type face number 5 (e.g., a times roman font)" is designated.

It should be noted that all the parameters need not always be designated. When the current font select command includes the same attributes as those of the previous font selection, the corresponding parameters can be represented by the symbol "=". For example, after the font select command of FIG. 3(B) is input and the desired characters have been printed, if a change only in the type size is needed, the font select command shown in FIG. 3(C) may be input. Then, the type face having the same attributes except for the 10-point type size type face can be selected.

Figures 2, 4:
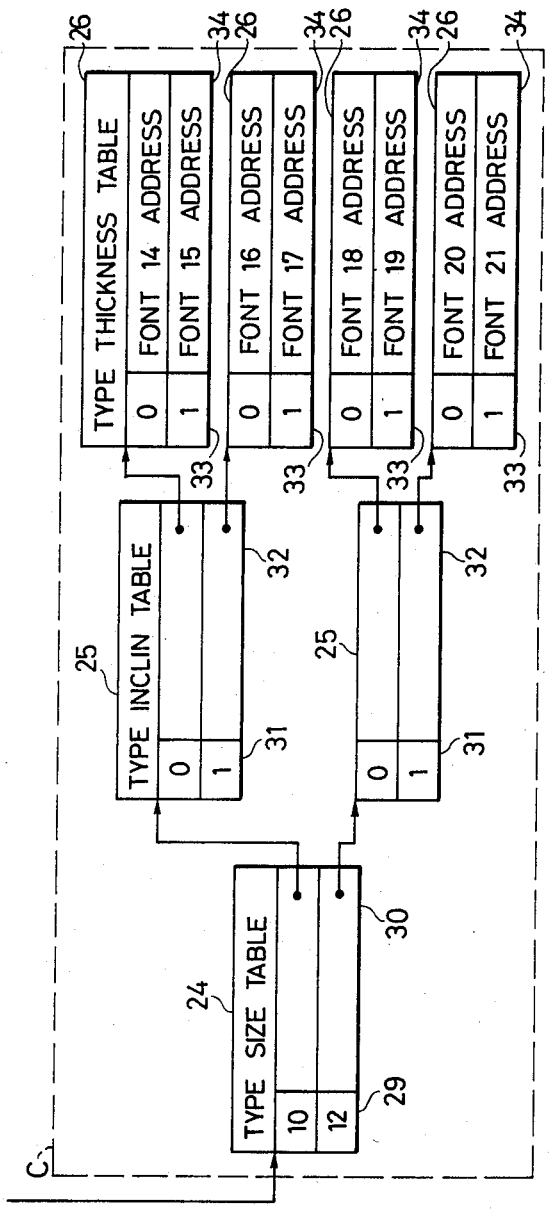
FIG. 4 composed of FIGS. 4-1 and 4-2, is a view showing allocation of a memory area of a font select table memory of FIG. 2.

FIG. 4 is an arrangement of the font select table memory 12 necessary for font selection. The font select table memory 12 includes type face tables 23, type size tables 24, type inclination tables 25 and type thickness tables 26. A set A has fonts of the type face "2", a set B has fonts of the type face "5" and a set C has fonts of the type face "7".

Figures 2, 6:
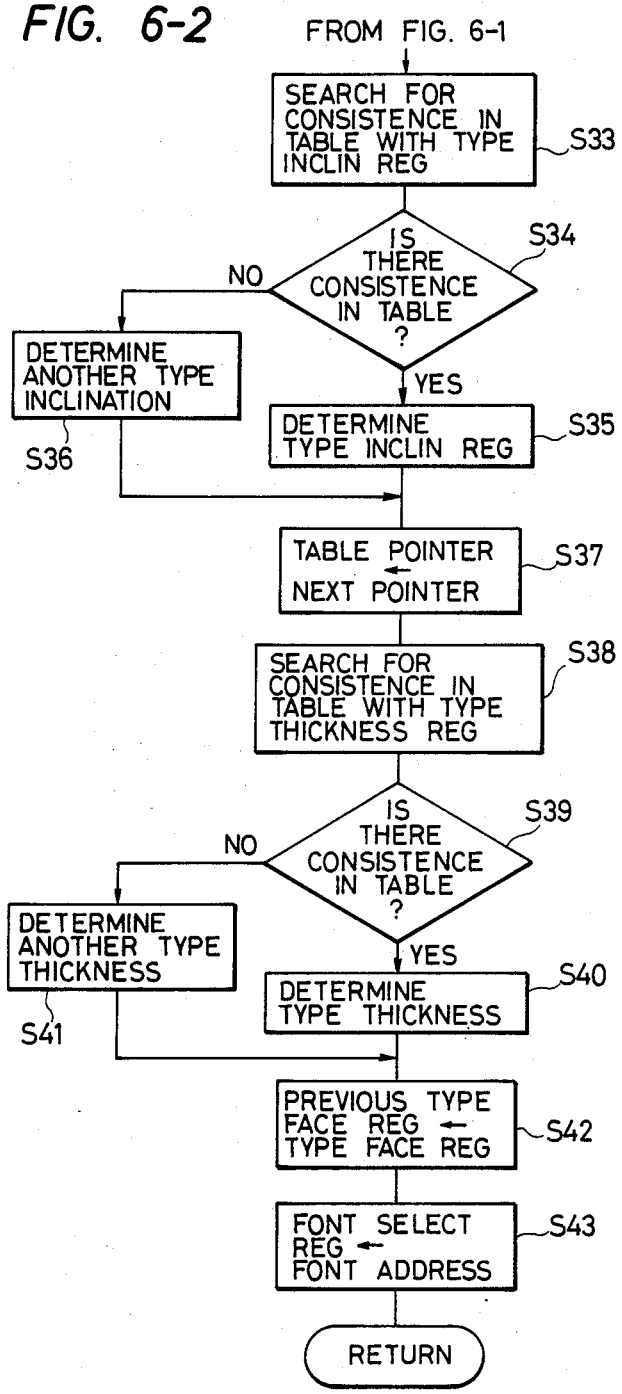
FIG. 6 composed of FIGS. 6-1 and 6-2 is a flow chart showing the font select processing operation in the processing procedure in FIG. 5 in more detail.

The operation of the control system of FIG. 2 will now be described with reference to flow charts of FIGS. 5 and 6. Note that the flow charts of FIGS. 5 and 6 are stored in the ROM in the CPU 4.

The character code data and the font select commands from the computer 1 are temporarily stored in the input buffer memory 3 through the input interface 2, and are thereafter supplied to the CPU 4. The CPU 4 initializes the font select table memory 12 in accordance with this font select command, in step S1. In other words, the CPU 4 reads data of the attributes of the respective fonts of the contents of the character pattern generator 6 and forms the table having the format as shown in FIG. 4 in the font select table memory 12. First, the fonts are sorted using the type face number as a key code and are stored in type face columns 27 of the type face table 23. Then, the different type size fonts having the same type face number are sorted using the type size number as a key code and are stored in type size columns 29 of the type size table 24. Start addresses of the type size table 24 are respectively stored in next pointer columns 28 of the corresponding type face numbers, thereby linking the type face table 23 with the type size table 24. In the same manner as described above, the type inclination table 25 and the type thickness table 26 are respectively formed. Thereafter, start addresses of the respective fonts are stored in font address columns 34 of the type thickness table 26, thus completing initialization of the font select table memory 12. The font select table memory 12 shown in FIG. 4 stores 21 types of fonts in the character generator 6, and is classified into the three large font sets A to C.

In step S2, the CPU 4 initializes the previous type face register 7, the type face register 8, the type size register 9, the type inclination register 10 and the type thickness register 11. In this initialization, the respective registers store the attributes of a default font which is provided in all character generators. Furthermore, a start address of the default font is stored in the font select register 5. Then, the flow advances to step S3. In step S3, one character code is read out from the input buffer memory 3. In step S4, if the determination result is not the end of the character data, the CPU 4 determines whether or not the data is the font select command 17, in step S5.

If NO in step S5, the flow advances to step S6. In step S6, the CPU 4 determines whether or not the output page memory 14 is filled with patterns corresponding to the character code data for one page. If NO in step S6, the flow jumps to step S8. In step S8, the patterns corresponding to the read-out input character codes are stored in the output page memory 14. In other words, the dot patterns corresponding to the input character code are read out from the character pattern generator 6 which is base-addressed by the font select register 5, and the character dot patterns for one page are stored in the output page memory 14 under memory position control of the CPU 4. Thereafter, in order to read out the next one character code from the input buffer memory 3, the flow returns to step S3. This main routine is repeated until the font select command 17 is read out.

In step S6 of this routine, when the CPU 4 determines that the output page memory 14 is filled with the character data for one page, dot signals for every one scanning line are supplied to the output interface 15 and are converted into the video signals. In correspondence with these video signals, the character patterns are printed onto a predetermined recording medium by the page printer 16. Thereafter, the flow advances to step S8.

In step S5 of this routine, when the CPU 4 determines that the font select command 17 is read out, the flow advances to step S9. In step S9, the CPU 4 calls a font select routine (will be described later) (FIG. 6) and performs predetermined processing. Thereafter, the flow returns to step S3.

Furthermore, in step S4, when the CPU 4 detects an end code which represents the end of the printing information data such as a code representing the end of the printing operation or a code representing the end of a file, the flow advances to step S10. In step S10, the CPU 4 determines whether or not the output page memory 14 is empty. If YES in step S10, the main routine ends. If NO in step S10, the flow advances to step S11. In step S11, the remaining character code data is printed by the page printer 16, and thereafter the main routine ends.

The font select routine will now be described with reference to FIG. 6. When the font select routine is read out in step S9 in correspondence with the read-out font select command 17 in step S3 of the above main routine, the four parameters 18 to 21 (FIG. 3) are read out from the input buffer memory 3 and are stored in the corresponding registers 8 to 11. A value of the type face parameter 18 as the first parameter is stored in the type face register 8, a value of the type size parameter 19 as the second register is stored in the type size register 9, a value of the type inclination parameter 20 as the third parameter is stored in the type inclination parameter 10, and a value of the type thickness parameter 21 as the fourth parameter is stored in the type thickness register 21, respectively. In this case, when the symbol "=" is designated in the above parameters 18 to 21, the CPU 4 recognizes that the corresponding parameters are omitted, and keeps the previous values in the corresponding registers.

In the font select routine, in step S22, a start address of the type face table 23 of the font select table memory 12 is stored in the table pointer register 13, thereby initializing it. Thereafter, the flow advances to step S23. In step S23, a value of the type face column 27 and that of the type face register 8 are compared with each other using as a key code the type face column 27 of the type face table 23 indicated by the table pointer register 13. In step S24, the comparison result is determined. If YES in step S24, the value is determined as the type face of the font in step S26.

On the other hand, if NO in step S24, it means that the designated type face does not exist in the character pattern generator 6. Therefore, this type face parameter is ignored and the previous value stored in the previous type face register 7 is transferred to the type face register 8, in step S25. Thereafter, the flow returns to step S23. Then, after the process of step S24, the previous type face is used in step S26 and no change in the type face is performed. Note that, in the case of the type face, it is quite difficult to select a type face which is near to a selected one, and it is usually useless. Therefore, in this case, it is better to select the previous type face. If the selected type face cannot be found for the first font select command, since the default type face number has been already stored in the previous type face register 7, there is no problem.

The type face attribute of the font is determined in step S26, and a value of the next pointer column 28 which follows the determined type face column 27 is transferred to the table pointer register 13, in step S27. Thereafter, in step S28, a value of the type size column 29 (FIG. 4) is compared with that of the type size register 9 using as a key code the type size column 29 of the type size table 24 which is indicated by the table pointer register 13 and belongs to the determined type face. In step S29, the comparison result is determined. If YES in step S29, the flow advances to step S30. In step S30, the corresponding value is determined as the type size of the selected font.

Meanwhile, if NO in step S29, it means that the designated type size does not exist in the character pattern generator 6. Therefore, in step S31, a value which is near to the value of the type size register 9 is selected and is determined as the type size of the selected font.

Thereafter, in step S32, a value of the next pointer column 30 which follows the determined type size column 29 is transferred to the table pointer register table 13. Then, in step S33, a value of a type inclination column 31 (FIG. 4) is compared with that of the type inclination register 10 using as a key code the type inclination column 31 of the type inclination table 25 which is indicated by the table pointer register 13 and belongs to the determined type face and type size. In step S34, the comparison result is determined. If YES in step S34, the value is determined as the type inclination of the selected font in step S35. In this case, since two kinds of the type inclination, i.e., normal and italic fonts are provided, one of these two type inclinations is selected in accordance with selection.

If NO in step S34, that is, in the case wherein, although the italic font is designated as the type inclination, the italic font does not exist in the character pattern generator 6, the selected font is replaced by the normal font in step S36.

Then, the flow advances to step S37. In step S37, a value of the next pointer column 32 which follows the type inclination column 31 is transferred to the table pointer register 13. In step S38, a value of a type thickness column 33 is compared with that of the type thickness register 11 using as a key code the type thickness column 33 which is indicated by the table pointer register 13 and belongs to the determined type face, type size and type inclination. In step S39, the comparison result is determined. If YES in step S39, the value is determined as the type thickness of the selected font in step S40. In this embodiment, since two kinds of the type thickness, i.e., regular and bold fonts, are provided, one of these type thicknesses is selected in accordance with selection.

If NO in step S38, that is, in the case wherein, although the bold is designated as the type thickness, the bold font does not exist in the character pattern generator 6, the selected font is replaced by the regular font. In the above subroutine, the respective attributes of the type face, type size, type inclination, and type thickness are determined and only one font address 34 is selected (FIG. 4).

Furthermore, the flow advances in step S42. In step S42, the value of the type face register 8 is transferred to the previous type face register 7, thereby preparing for the next font selection command. In step S43, the determined font address 34 is transferred to the font selection register 5. Then, the font select routine is completed and the flow returns to the main routine.

When the process of this font select routine is performed, the font select register 5 is rewritten by the font address having the value equal to the designated attribute or nearest thereto. Therefore, the character pattern generated in step S8 of the main routine uses the font in accordance with the replaced font address. For example, according to the above font select routine, when the font select command of FIG. 3(B) for selecting the 8-point bold and italic font of the type face 5 (times roman font) is supplied to the output apparatus of the font mounting state shown in FIG. 4, the 9-point italic and bold font of the type face "5" is selected. In this manner, according to the present invention, even if no font having the designated attributes exists, the font having the nearest attributes is selected and the printing operation is effectively continued.

In this embodiment, the font selection is performed in accordance with the four attributes. However, kinds of attributes and the number thereof can be further increased or unnecessary attributes can be omitted. For example, a character set (corresponding to code systems of respective languages such as ASCII, JIS, ISO and the like) can have a highest priority. Alternatively, a type pitch (character feed amount) can be easily adopted instead of the type size. Meanwhile, in a Japanese type face, the type inclination attribute generally becomes unnecessary. Furthermore, the value itself of each of the attributes can have a large number of levels. For example, in this embodiment, the parameters of the type thickness are "0" (regular) and "1" (bold). However, the number of levels can be increased to correspond to the type thicknesses of extra bold, bold, regular, thin and extra thin fonts, thereby improving printing quality.

Furthermore, in this embodiment, the numeral data is adopted as the parameters which indicate the attributes of the font. However, if the attributes can be designated by mneumonic expression with English letters, e.g., "PICA", "ELITE" and the like for the type face "regular", "bold" and the like for the type thickness, more precise font selection can be performed.

As described above, according to the above configuration, a command having a content of "a font having a type size of about 10-point" or "if an italic font is provided, select the italic font" can be performed.

What is claimed is:

1. An image data output apparatus comprising:
   font storing means capable of storing plural kinds of fonts each having attribute factors therein;
   input means for inputting a font selection command indicating selection of a font from said font storing means; and
   selecting means for selecting a font from said font storing means in accordance with the command inputted from said input means;
   said selecting means performing selection of a font designated by the font selection command when the designated font is stored in said font storing means, and performing selection of another font having the same attribute factors as those of the font designated by the font selection command when the designated font is not stored in said font storing means.

2. An apparatus according to claim 1, further comprising attribute factor data storing means for storing therein attribute factor data representing attribute factors of each font stored in said font storing means, wherein said selecting means selects one of the fonts stored in said font storing means on the basis of the attribute factor data.

3. An apparatus according to claim 2, wherein said attribute factor data storing means stores therein first attribute factor data having a value associated with a typeface.

4. An apparatus according to claim 2, wherein said attribute factor data storing means stores therein second attribute factor data having a value associated with a character size.

5. An apparatus according to claim 2, wherein said font storing means stores a font as a pattern therein, said font storing means being detachable from the apparatus.

6. An image data output apparatus comprising:
   font storing means capable of storing a plurality of fonts therein; and
   selecting means for selecting one of fonts stored in said font storing means,
   wherein said selecting means includes first designating means for designating an attribute of a font to be selected for each factor of the attribute;
   second designating means for designating an attribute of a font stored in said font storing means for each factor of the attribute, and
   determining means for determining a font to be outputted in accordance with the respective factors of the attribute designated by said first designating means and those designated by said second designating means.

7. An apparatus according to claim 6, wherein said determining means determines the font to be outputted even when the respective factors of the attribute designated by said first designating means do not coincide with those designated by said second designating means.

8. An apparatus according to claim 7, said determining means determines that a font to be outputted is a font having the same attribute factors as those designated by said first designating means when the respective factors of the attribute designated by said first designating means do not coincide with those designated by said second designating means.

9. An apparatus according to claim 6, wherein said second designating means designates attributes of a plurality of fonts stored in said font storing means for each factor of the attribute.

10. An apparatus according to claim 9, wherein said font storing means is detachable from said apparatus.

11. An apparatus according to claim 6, wherein said first designating means designates only a factor to be changed.

12. An apparatus according to claim 2, wherein said font selection command includes a plurality of parameters representing attribute factors of a font to be selected.

13. An apparatus according to claim 12, further comprising parameter storing means for storing a plurality of parameters therein, wherein said selecting means determines whether or not the font designated by said font selection command is stored in said font storing means on the basis of both the parameter stored in said parameter storing means and the attribute factor data stored in said attribute factor data storing means.

14. An apparatus according to claim 6, wherein said first and second designating means comprise first and second memory means, respectively.

15. An apparatus according to claim 6, wherein the attribute factors designated by said first and second designating means are associated with a typeface and a character size, respectively.

* * * * *

UNITED STATES PATENT AND TRADEMARK OFFICE
CERTIFICATE OF CORRECTION

PATENT NO. : 4,686,525

DATED : August 11, 1987

INVENTOR(S) : SATOSHI NAGATA

It is certified that error appears in the above-identified patent and that said Letters Patent is hereby corrected as shown below:

COLUMN 2

Line 16, "require" should read --requires--.

COLUMN 4

Line 22, "font)"is" should read --font" is--.

COLUMN 5

Line 46, "(will" should read --(which will--.
Line 68, "register" (first occurrence) should read --parameter--.

COLUMN 6

Line 2, "parameter" (second occurrence) should read --register--.

UNITED STATES PATENT AND TRADEMARK OFFICE
CERTIFICATE OF CORRECTION

PATENT NO. : 4,686,525

DATED : August 11, 1987

INVENTOR(S) : SATOSHI NAGATA

It is certified that error appears in the above-identified patent and that said Letters Patent is hereby corrected as shown below:

<u>COLUMN 8</u>

Line 6, "mneumonic" should read --mnemonic--.

<u>COLUMN 9</u>

Line 4, "7, said" should read --7, wherein said--.

Signed and Sealed this

Twenty-ninth Day of December, 1987

*Attest:*

DONALD J. QUIGG

*Attesting Officer*          *Commissioner of Patents and Trademarks*